United States Patent
Gaudfrin

(10) Patent No.: US 11,173,430 B2
(45) Date of Patent: Nov. 16, 2021

(54) FILTER WITH CLOSELY-SPACED VERTICAL PLATES

(71) Applicant: GAUDFRIN, Saint Germain en Laye (FR)

(72) Inventor: Guy Gaudfrin, Saint Nom la Breteche (FR)

(*) Notice: Subject to any disclaimer, the term of this patent is extended or adjusted under 35 U.S.C. 154(b) by 0 days.

(21) Appl. No.: 16/345,944

(22) PCT Filed: Oct. 26, 2017

(86) PCT No.: PCT/FR2017/052963
§ 371 (c)(1),
(2) Date: Apr. 29, 2019

(87) PCT Pub. No.: WO2018/078294
PCT Pub. Date: May 3, 2018

(65) Prior Publication Data
US 2019/0329163 A1 Oct. 31, 2019

(30) Foreign Application Priority Data

Oct. 27, 2016 (WO) .................. PCT/FR2016/052797

(51) Int. Cl.
*B01D 29/39* (2006.01)
*B01D 35/16* (2006.01)
*B01D 29/15* (2006.01)
*B01D 29/52* (2006.01)
(Continued)

(52) U.S. Cl.
CPC .......... *B01D 29/395* (2013.01); *B01D 35/16* (2013.01); *B01D 29/15* (2013.01); *B01D 29/52* (2013.01); *B01D 29/668* (2013.01); *B01D 29/94* (2013.01)

(58) Field of Classification Search
CPC ...... B01D 29/395; B01D 35/16; B01D 29/15; B01D 29/52; B01D 29/668; B01D 29/94; B01D 29/39; B01D 29/54; B01D 35/30; B01D 2201/30; B01D 2201/31;
(Continued)

(56) References Cited

U.S. PATENT DOCUMENTS 4,790,935 A 12/1988 Johnson

FOREIGN PATENT DOCUMENTS

| CN | 201921580 U | 8/2011 |
|---|---|---|
| EP | 0226478 A1 | 6/1987 |
| FR | 1425376 A | 1/1966 |

(Continued)

OTHER PUBLICATIONS

English Machine Translation of FR1425376A.*
(Continued)

*Primary Examiner* — Madeline Gonzalez
(74) *Attorney, Agent, or Firm* — Kenealy Vaidya LLP

(57) ABSTRACT

Some embodiments are directed to a filter for use with a drain, the filter comprising: at least two external manifolds; and multiple vertical plates that each includes a tube connected to one of the at least two external manifolds, wherein two adjacent vertical plates of the multiple vertical plates are connected to different manifolds of the at least two manifolds, each of the multiple vertical plates also including at least one filter element, each of the at least one filter element including: at least two drains; and a cloth defining compartments configured such that the drain is insertable therein.

8 Claims, 11 Drawing Sheets

(51) Int. Cl.
  *B01D 29/66* (2006.01)
  *B01D 29/94* (2006.01)
(58) Field of Classification Search
  CPC .... B01D 2201/40; B01D 25/12; B01D 25/21;
      B01D 25/215; B01D 25/122; B01D
      25/164
  USPC ....... 210/486, 224, 231, 248, 232, 331, 346,
      210/108, 109, 275, 333.01, 408, 411
  See application file for complete search history.

(56) References Cited

FOREIGN PATENT DOCUMENTS

GB    2094653 A    9/1982
WO    2006/032736 A1    3/2006

OTHER PUBLICATIONS

International Search Report and Written Opinion for PCT Patent App. No. PCT/FR2017/052963 (dated Feb. 5, 2018) with partial English translation.

* cited by examiner

FILTER WITH CLOSELY-SPACED VERTICAL PLATES

CROSS REFERENCE TO RELATED APPLICATIONS

This application is a national phase filing under 35 C.F.R. § 371 of and claims priority to International Patent Application No. PCT/FR2017/052963, filed on Oct. 26, 2017, which claims the priority benefit under 35 U.S.C. § 119 of International Patent Application No. PCT/FR2016/052797, filed on Oct. 27, 2016, the contents of which are hereby incorporated in their entireties by reference.

BACKGROUND

Some embodiments relate to a vertical plate filter press with improved discharge enabling its plates to be closer together and to a method of discharging it.

Related art devices used on an industrial scale for liquid/solid separation of a charged suspension include in particular filter presses with a cylindrical enclosure termed a "tank" in which the plates are disposed vertically. These plates include one or more filter elements. These plates are disposed either parallel to one another or radially around the center of the tank. The first arrangement is termed a "parallel" arrangement; the second is termed "star" arrangement. These plates generally carry filter cloths and are provided with a tube connected to an external manifold for evacuating the filtered liquid, termed the "filtrate".

Filters with the plates disposed in a star arrangement include filters that include only plates including the same number of filter elements. These filters are termed "single star" filters. There are also filters that include an alternation of plates with two filter elements including a long tube, termed "double plates", and plates with one filter element including a short tube, termed "single plates". Single plates are accommodated at the interior periphery of the tank, in the space left free by the double plates. These filters are termed "double star" filters.

The plates are immersed in the tank containing a suspension to be filtered. This tank is pressurized whereas the successive plates are subjected to a reduced pressure via their tube in order to filter the suspension (the filtration phase), and then an increased pressure in order to detach the "cake", i.e. the solid fraction of the suspension that has accumulated on the cloth during filtration (the discharge phase). When discharging is effected using a contraflow fluid, this is referred to as "blowing".

If blowing is applied simultaneously to all the plates of a filter, it is desired in this embodiment to halt the extraction of the filtrate temporarily, which is a problem on an industrial scale because continuous extraction is not assured.

In related art filters in which the plates are disposed in parallel or in a star, in order to assure continuous filtrate extraction blowing is applied alternately to groups of adjacent plates, the plates of the other groups still carrying out filtration. The space between the plates must or should be sufficient for the facing cakes to be able to fall off during discharging without causing jams fatal to the operation of the filter. This limits the number of plates that can be accommodated in a tank of given diameter.

In all the plates of a double star filter a single plate and an adjacent double plate have a common outlet and are therefore discharged together. Discharging of adjacent plates is inevitable.

To assure continuous filtrate extraction with a maximum number of plates accommodated in a tank of given diameter it is desired in this embodiment to improve the discharge process to enable the plates to be placed closer together.

More than fifty years ago attempts were made to improve the discharge process by producing filters in which adjacent plates are not discharged. The solution envisaged was not satisfactory because the cake from each discharged plate came to be pressed against the cake of the adjacent plates still carrying out filtration, which considerably reduced the efficiency of the filters. This solution was therefore entirely abandoned.

SUMMARY

Some embodiments therefore propose a filter that is more compact, enables continuous filtrate extraction and is free of the aforementioned disadvantages.

The filter with vertical plates according to some embodiments includes plates each including a tube connected to an external manifold, the filter being characterized in that it includes at least two external manifolds, in that, for all the plates, two adjacent plates are connected to two different external manifolds and in that each plate includes at least one filter element, each filter element being constituted of at least two drains and a cloth, the cloth having compartments in each of which a drain is inserted. By not discharging two adjacent plates at the same time, only one of the two facing cakes is detached rather than both of them. The construction of these plates enables low inflation of the cloth during discharge and therefore limited movement of the cake. It is therefore possible to reduce the space provided between the plates with no risk of causing jams fatal to the operation of the filter when the cakes fall off and with no risk of pressing the discharged cakes onto the plates still carrying out filtration. This makes it possible to increase the number of plates in the filter.

According to one particular embodiment, the plates of the filter are disposed as a star.

According to one particular disposition, the filter includes an alternation of plates with two filter elements including a long tube, termed "double plates", and plates with one filter element including a short tube, termed "single plates". The single plates are accommodated at the interior periphery of the tank, in the space left free by the double plates. This makes it possible to increase the number of plates for large filters and therefore the filtration capacity. The filter is then termed a "double star" filter.

Each single plate is advantageously connected to a double plate, thus forming pairs of plates. The connection of the single plates and the double plates makes it possible to halve the number of connections to the external manifolds. The space available outside the tank is therefore optimized.

The short tube of a single plate is advantageously connected to the long tube of a double plate by a pipe connecting the two plates.

Each pair of plates is advantageously connected to one and only one external manifold through the tube of the double plate. The section of the mouth of the tube of the double plate is greater than that of the single plate. In addition to its own flow of filtrate, it is therefore able to take up the flow of filtrate extracted from the single plate during filtration and, in addition to its own flow of blowing fluid, to take up the flow of blowing fluid intended for the single plate during discharge.

The double star filter advantageously includes N external manifolds, N being greater than or equal to three. It is therefore possible to apply blowing alternately to N groups of plates.

According to one particular feature, for all the pairs of plates, N consecutive pairs of plates are connected to the N external manifolds. The single plate and the double plate of the same pair are spaced by an even number of plates. The pairs of plates connected to the same external manifold therefore form a group of non-adjacent plates termed an "independent group of plates", in which the plates can be discharged simultaneously. The filter therefore includes N independent groups of plates that can be discharged by establishing a blowing contraflow alternately in each of the N external manifolds. In a filter including three external manifolds, the single and double plates of the same pair are therefore spaced by two plates. This disposition enables discharge in the filter including three external manifolds one plate every three plates, i.e. when a plate is being discharged the two adjacent plates and those directly following on from them are not being discharged.

Some embodiments also concern a method of discharging cakes from a filter with vertical plates having at least one of the foregoing features, and the method is characterized in that each external manifold has passed through it a flow of filtrate that is reversed in accordance with a predefined cycle and in that the cycles of all the external manifolds are identical with a phase difference between them. In each external manifold the reversals of the flow correspond to passages from the filtration phase to the phase of discharging the plates connected to that manifold, and vice versa. In each discharge phase, only the plates connected to only one external manifold are discharged, the other plates still carrying out filtration, therefore assuring continuous filtrate extraction. This ensures that two adjacent plates are never or rarely discharged at the same time.

The cycles of reversing the filtrate flows of all the external manifolds are advantageously phase-shifted by the same time interval. The filtration phases of each independent group of plates must or should be phase-shifted by the same time interval in order to limit variations of the flow of filtrate extracted from the filter.

According to a first variant, the flow of filtrate is reversed by a pump through a blower circuit that is able to connect the outlet of the pump to each of the external manifolds. This pump sends the filtrate alternately into each of the external manifolds at a pressure higher than that of the filter, thereby pressurizing the corresponding plates in order to proceed to discharging them. According to a second variant, the flow of filtrate is reversed by an over pressurized balloon filled with the filtrate via a blower circuit able to connect the outlet of the over pressurized balloon to each of the external manifolds. This over pressurized balloon, fed with compressed air via a differential pressure regulator, sends the filtrate alternately into each of the external manifolds at a pressure higher than that of the filter, thereby pressurizing the corresponding plates in order to proceed to discharging them.

For these first two variants, the blower circuit is advantageously equipped in parallel with a safety overflow between 1 and 5 m inclusive high above the filter and connected to the interior of the filter in the upper part of the tank of the filter. This safety overflow naturally limits the blowing pressurization in order to prevent all risk of damaging the filter elements of the plates.

According to a third variant, the flow of filtrate is reversed by a balloon filled with the filtrate under load on the filter and connected to the tank of the filter in their upper part, this reversal of the flow is effected through a blower circuit adapted to connect the outlet of the balloon to each of the external manifolds. This balloon, subjected to the same pressure as the filter by the communication between their upper part sends the filtrate, by gravity alone, alternately into each of the external manifolds at a pressure higher than that of the filter, thereby over-pressurizing the corresponding plates in order to proceed to discharging them.

According to a fourth variant, the flow of filtrate is reversed by balloons filled with the filtrate under load on the filter and connected to the tank of the filter in their upper part, this reversal being effected through blower circuits each able to connect the outlet of one and only one of the balloons to one and only one of the external manifolds. These balloons, subjected to the same pressure as the filter by the connection in their upper part, send the filtrate, by gravity alone, alternately into each of the external manifolds at a pressure higher than that of the filter, thereby over-pressurizing the corresponding plates in order to proceed to discharging them.

For these last two variants, the upper part of the balloons is advantageously situated between 1 and 5 m above the filter. This therefore naturally limits the blowing over-pressurization in order to prevent all risk of damaging the filter elements of the plates.

BRIEF DESCRIPTION OF THE FIGURES

Other advantages of some embodiments will be apparent to the person of ordinary skill in the art on reading the following examples, illustrated by the appended figures, which are provided by way of example.

BRIEF DESCRIPTION OF EXEMPLARY EMBODIMENTS

It is considered in the remainder of the description that the term high refers to the top parts and the term low to the bottom parts of FIG. 1 and FIGS. 6 to 12. The same elements bear the same references.

Figure 2:
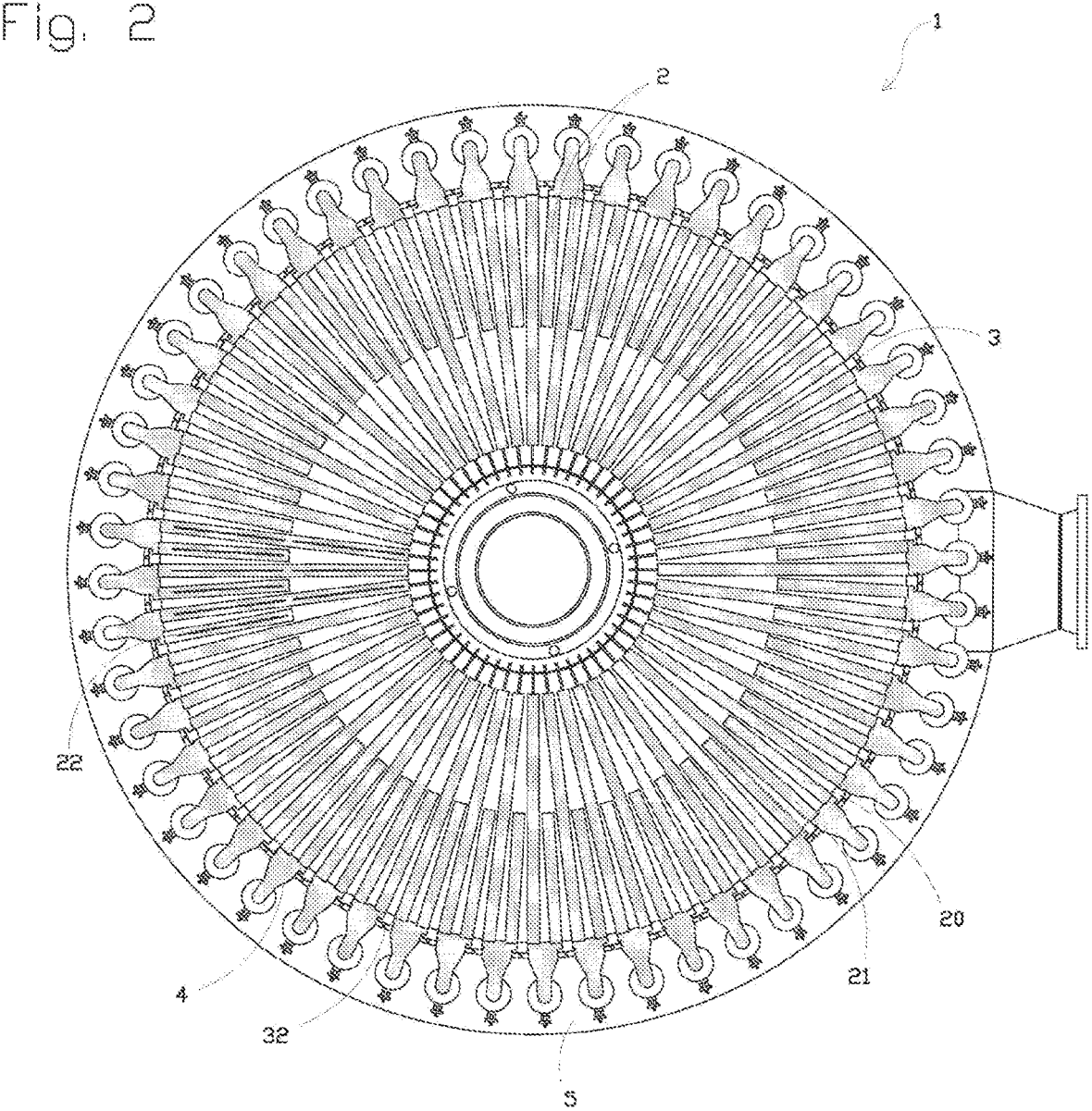
FIG. 2 is a view from above of a related art double star filter the tank of which is cut off at the level of the tubes of the plates of the filter.
Figure 3:
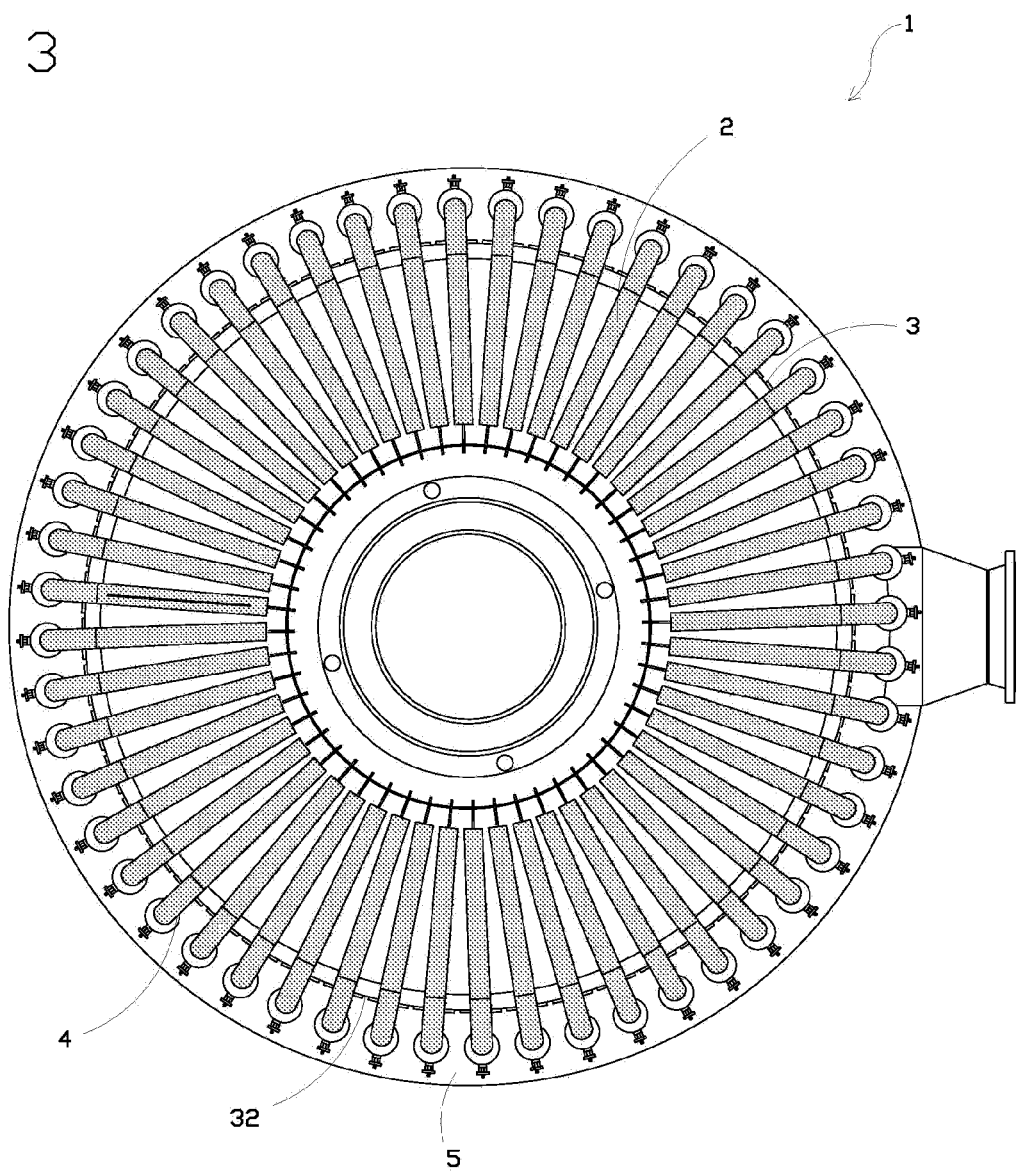
FIG. 3 is a view from above of a related art single star filter the tank of which is cut off at the level of the tubes of the plates of the filter.

A related art filter 1 shown in FIG. 2 or FIG. 3 is a filter press with vertical plates 2 for the liquid/solid separation of a charged suspension. It is constituted of a cylindrical tank 3 with a conical bottom wall 30 and a domed removable cover 31 shown in FIGS. 9 to 12. The plates 2 are suspended vertically inside the tank 3 and disposed radially in a star arrangement.

The small diameter related art filters 1 shown in FIG. 3 are equipped with identical plates 2 connected through the wall 32 of the tank 3 by bent tubes 4 termed "filtrate outlets" to an exterior manifold 5 that extends around the filter (single star disposition).

The large diameter related art filters 1 shown in FIG. 2 are equipped with plates 2 of two different types, plates 2 with one filter element 22, termed single plates 20, and plates 2 with two filter elements 22, termed double plates 21. The single plates 20 and the double plates 21 are connected through the wall 32 of the tank 3 by the filtrate outlets 4 to an external manifold 5 (double star disposition). In these cases, all the plates 2 are grouped in pairs, a single plate 20 and an adjacent double plate 21 having a common filtrate outlet 4.

Figure 1:
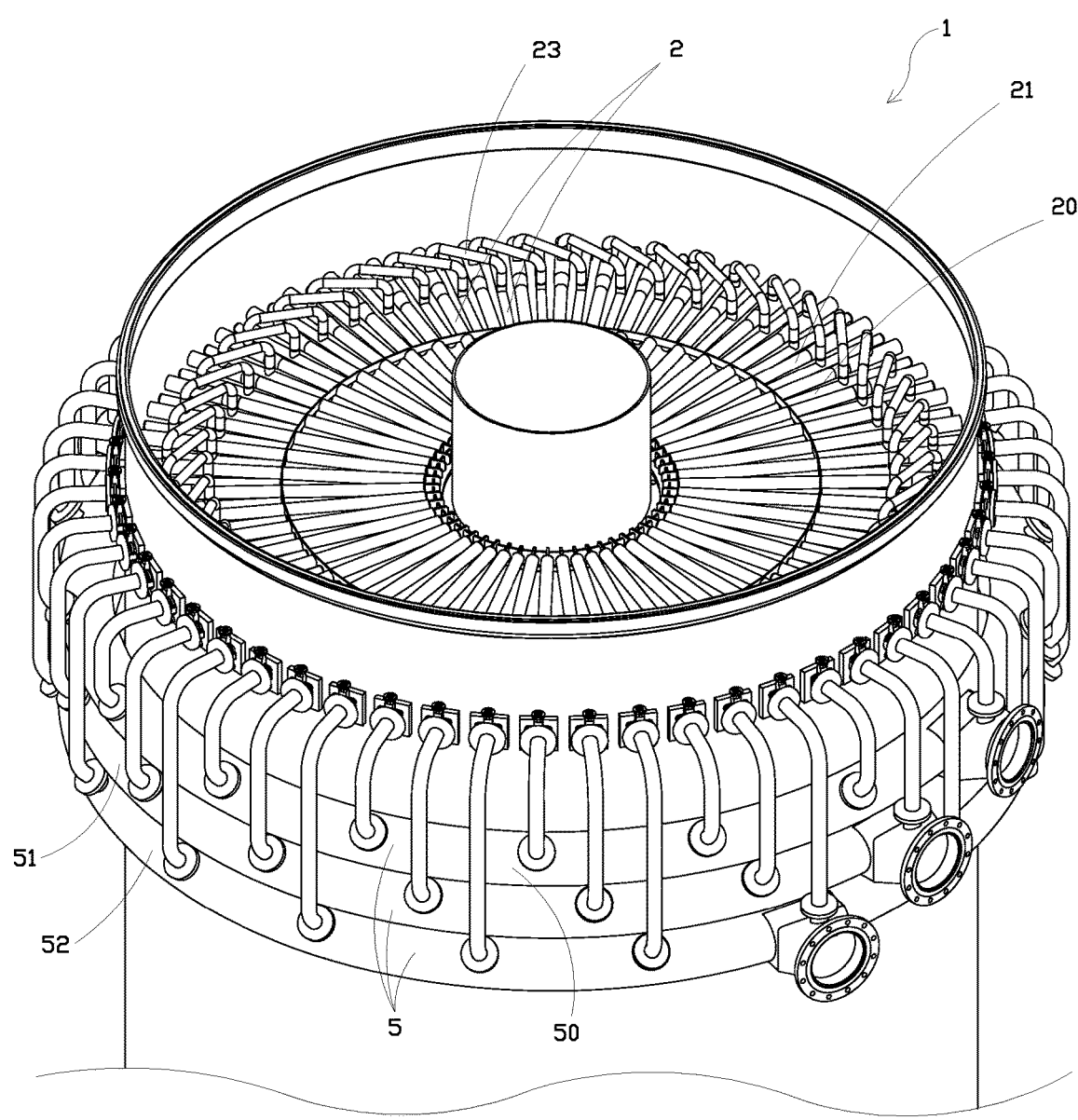
FIG. 1 is a perspective view of a double star filter according to some embodiments without its cover.

The filter 1 from FIG. 1 is a double star filter according to some embodiments in which the vertical plates 2 are connected in independent groups to three distinct external manifolds 5. One third of the single plates 20 and of the double plates 21 are therefore connected to a first external manifold 50, a second of those thirds to a second external manifold 51, and the third of those thirds to the third external manifold 52. Each single plate 20 is connected to a double plate 21 by a pipe 23, thus forming a plate pair. The double plate 21 of each pair is connected to one and only one external manifold 5 via a filtrate outlet 4.

In this example the number N of external manifolds 5 is three. For N external manifolds 5, N being greater than or equal to three, there will be N independent groups of plates 2 each connected to one of the N external manifolds 5.

Figure 4:
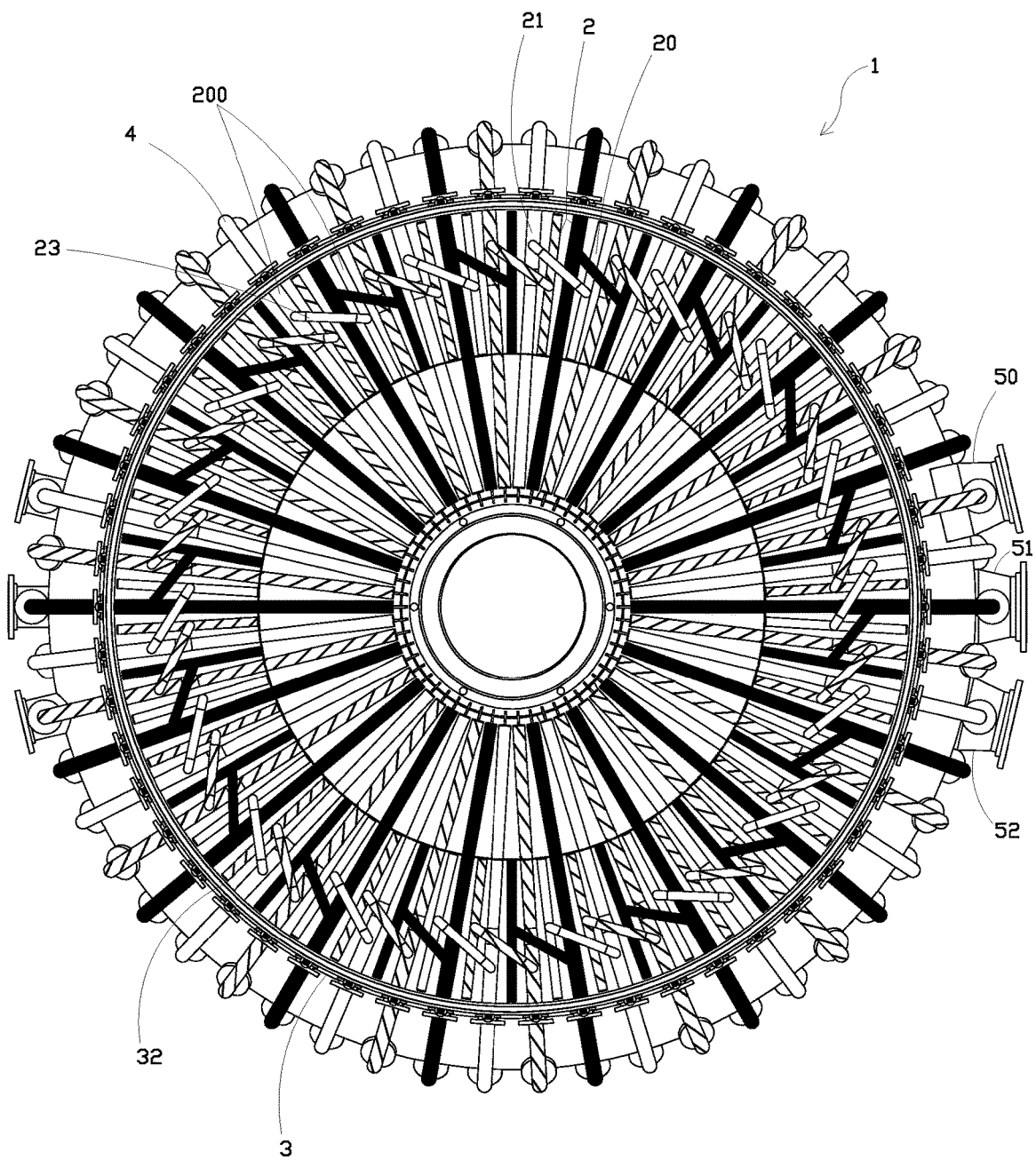
FIG. 4 is a view from above of the double star filter according to some embodiments of FIG. 1 without its cover.

As can be seen in FIG. 4, in all the pairs of plates 2 three consecutive pairs of plates 2 are therefore connected to the three external manifolds 50, 51 and 52. The single plates 20 and the double plates 21 of the same pair are spaced by two plates 2. The pairs of plates 2 connected to the same external manifold 50, 51 or 52 thus form an independent group of non-adjacent plates 2. The filter therefore includes three independent groups of plates 2. A first independent group of plates 2 is represented in black in FIG. 4, a second group cross-hatched, and the third group in white. As can be seen, a double plate 21 of the first group (black) follows on from a single plate 20 of the third group (white), then a double plate 21 of the second group (cross-hatched), then a single plate 20 of the first group (black), then a double plate 21 of the third group (white), then a single plate 20 of the second group (cross-hatched), then a double plate 21 of the first group (black), and so on. The single plates 20 and the double plates 21 of the same pair, because of the distance between them, are no longer connected to one another through the wall 32 of the tank 3 as in the related art, but instead by a removable pipe 23 represented in FIG. 4 in the color of the group of independent plates to which the pipe 23 belongs. In this arrangement, the filter elements of the same group are never or rarely adjacent. In the case of FIG. 4, the three modes of representation used (black, cross-hatched and white) highlight the various flow circuits through the tubes 200, the pipes 23 and the filtrate outlets 4.

In this example the number N of external manifolds 5 is three and the single plate 20 and the double plate 21 of the same pair are spaced by two plates 2. For N external manifolds 5, N being greater than or equal to three, the single plate 20 and the double plate 21 of the same pair will be spaced by two or another even number of plates 2.

Figure 6A:
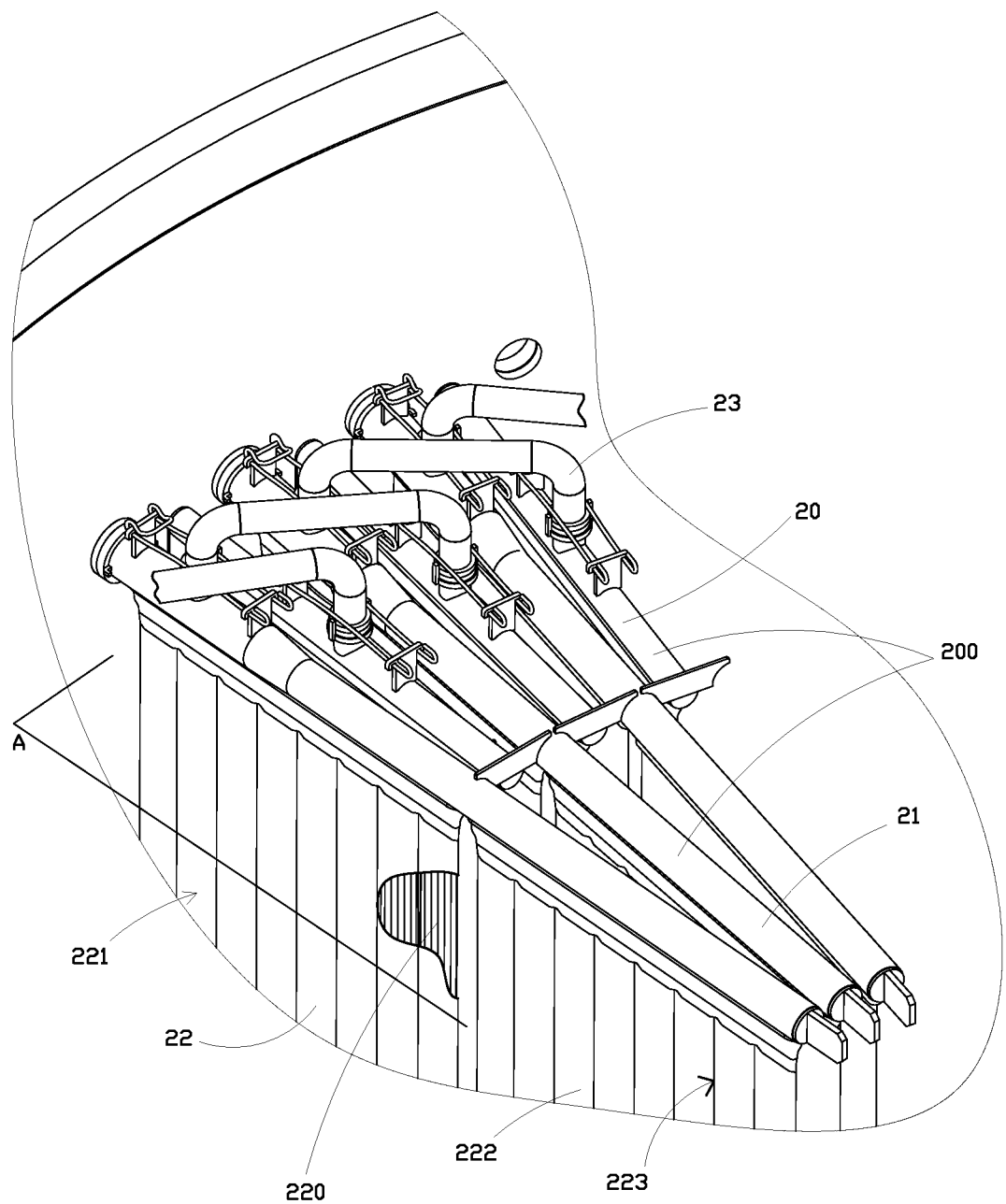
FIG. 6a is a detail perspective view of single plates and double plates and the pipe connecting them in some embodiments of FIG. 1.
Figure 6B:
FIG. 6b is a view of a plate from FIG. 6a in section on the plan A.
Figure 7:
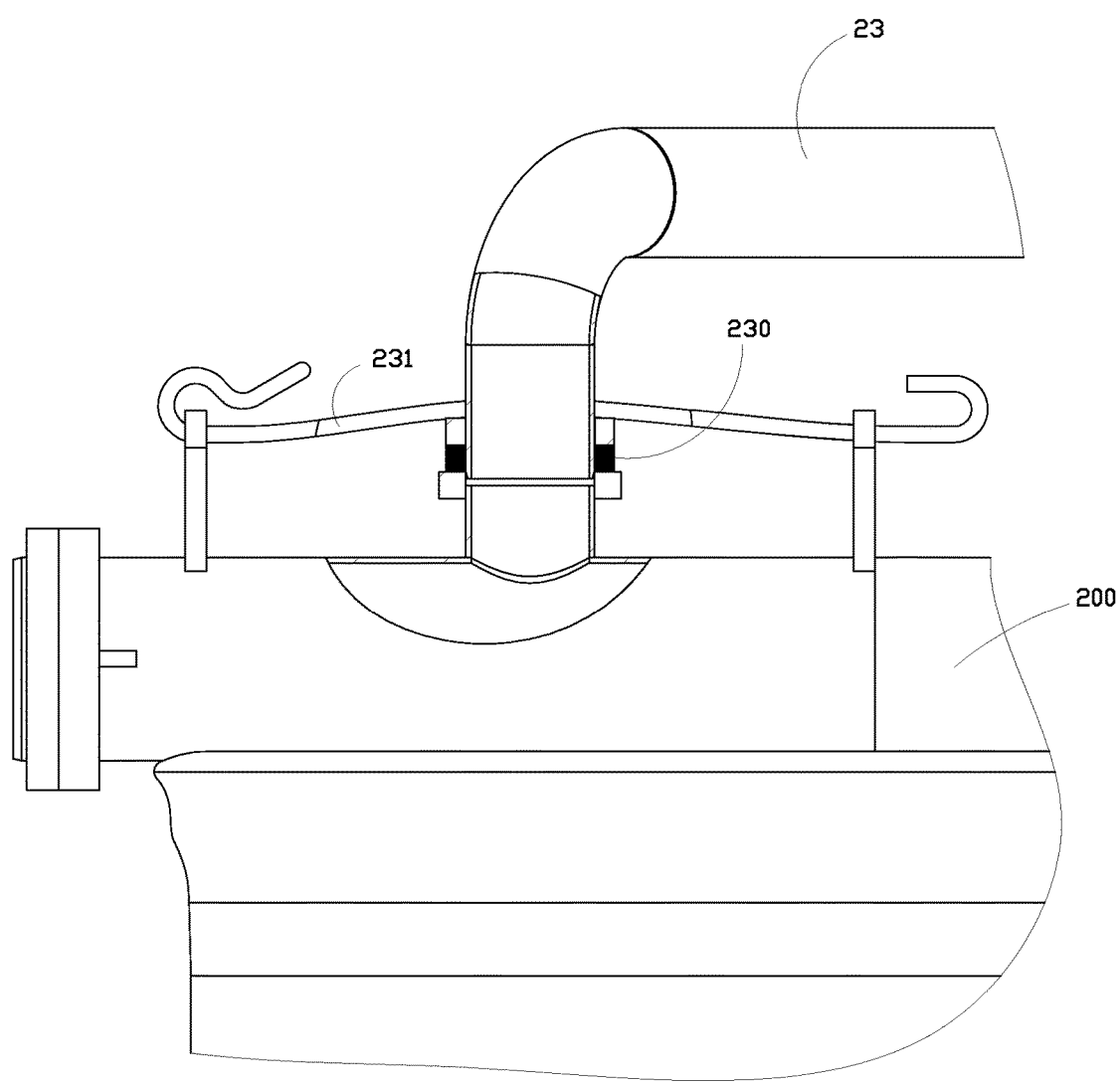
FIG. 7 is a section showing the detail of the connection between the tube of a filter plate and a connecting pipe from FIG. 6a, FIG. 8a is a developed diagrammatic sectional view of four adjacent plates discharged simultaneously using a related art technique.

It can be seen in FIGS. 6a and 7 that all the single plates 20 and all the double plates 21 respectively include one and two filter elements 22 each constituted of drains 220 and a cloth 221. These filter elements 22 are connected to the tubes 200 of the plates 2. Each connecting pipe 23 connects the tubes 200 of the pairs of plates 2, forming a bridge between them. Seals 230 placed between the tubes 200 and each of the two ends of the pipes 23 are compressed by wire springs 231 that exert sufficient force to guarantee a seal. As shown in FIG. 6a the filter elements 22 include a plurality of drains 220, each drain being disposed in a compartment 222 formed in the cloth 221. These compartments 222 may be produced for example by seams or welds 223 on the cloth 221. These filter elements 22 are described in detail in the patent EP226478 hereby incorporated by reference. FIG. 6b shows the filter element 22 in section and it can be seen that, because they are narrow, the compartments 222 are inflated relatively slightly and therefore enable the filter elements to be closer to one another than conventional filter elements not including compartments 222.

Figure 5A:
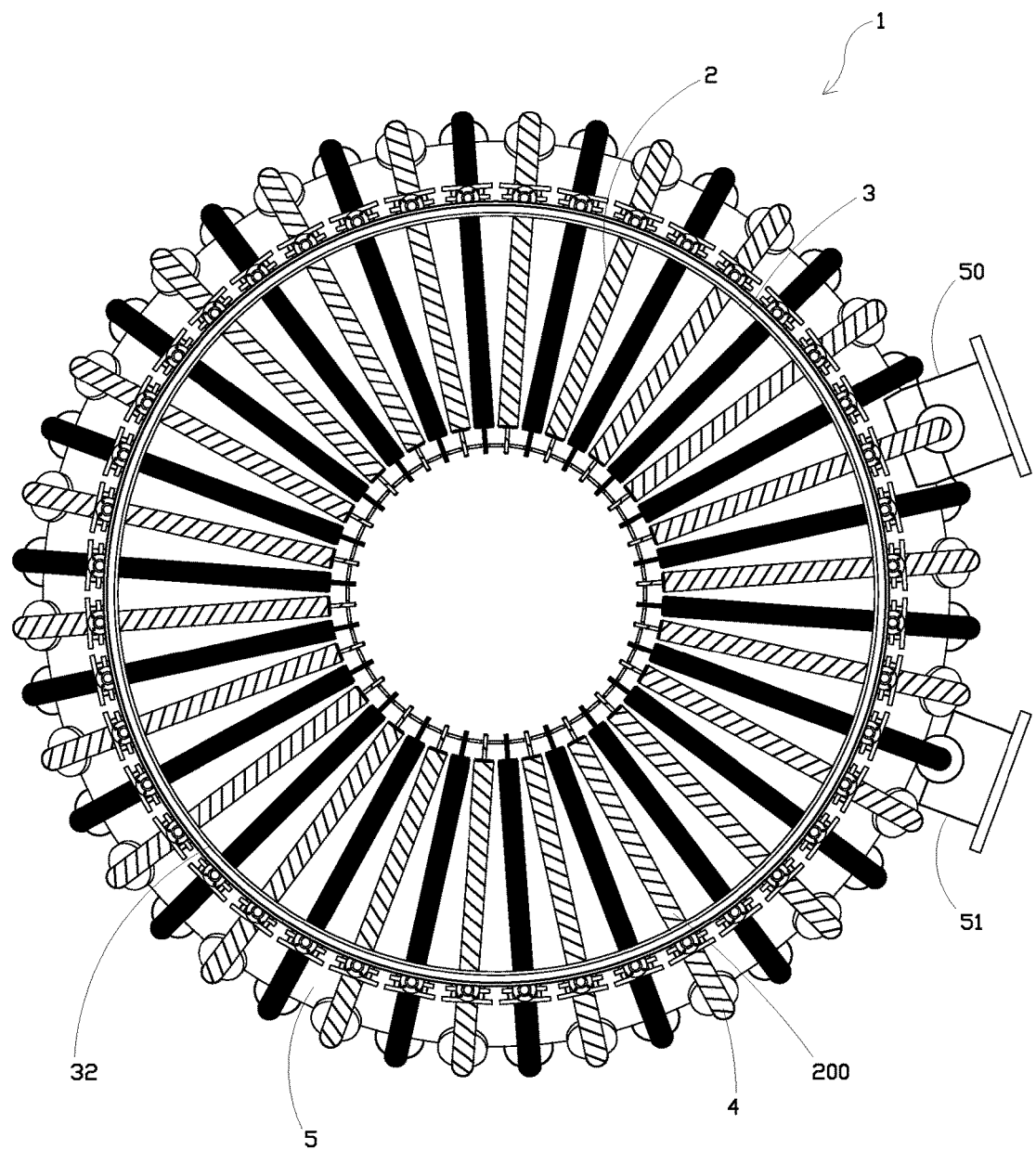
FIG. 5a is a view from above of a single star filter according to the invention without its cover.

The filter 1 from FIG. 5a is a single star filter according to the invention, in which the identical plates 2 are connected in independent groups to two distinct external manifolds 5. Thus one half of the plates 2 are connected to a first external manifold 50 and the second half to the second external manifold 51.

Figure 5B:
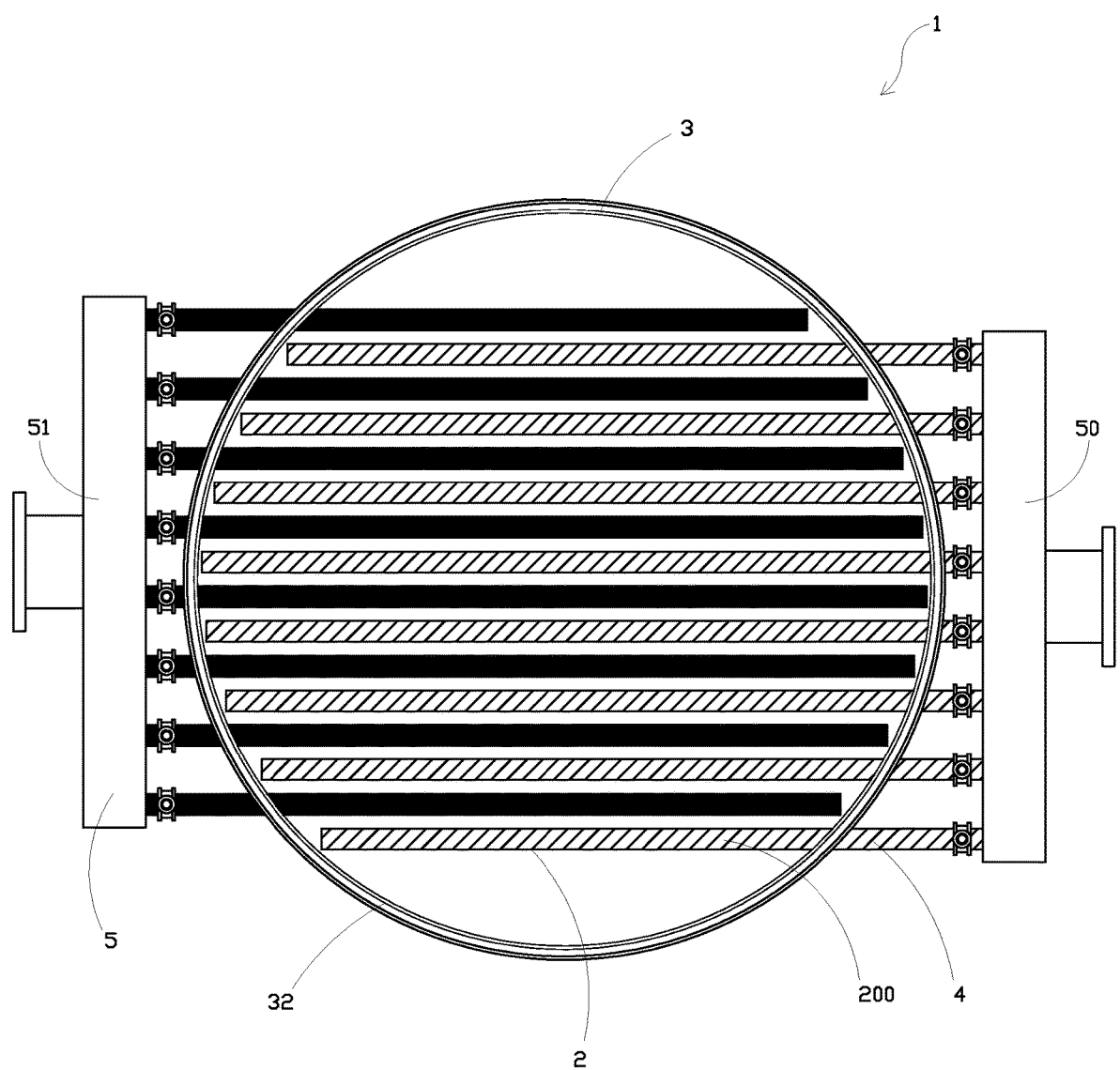
FIG. 5b is a view from above of a filter according to some embodiments without its cover and with the plates disposed in parallel.

The filter 1 from FIG. 5b is a filter according to some embodiments in which the plates 2 are disposed in parallel and connected in independent groups to two distinct external manifolds 5. Thus one half of the plates 2 are connected to a first external manifold 50 and the second half to the second external manifold 51. As can be seen in FIG. 5a and FIG. 5b, in all the plates 2 two consecutive plates 2 are therefore connected to the two external manifolds 50 and 51. The plates 2 connected to the same external manifold 50 or 51 therefore form an independent group of non-adjacent plates 2. The filter therefore includes two independent groups of plates 2. A first independent group of plates 2 is represented in black in FIG. 5a and in FIG. 5b and the second independent group of plates 2 is represented cross-hatched. As can be seen, a plate 2 of the first group (black) follows on from a plate 2 of the second group (cross-hatched), then a plate 2 of the first group (black), and so on. In this arrangement, the filter elements 22 of the same group are never or rarely adjacent. In the case of FIG. 5a and in the case of FIG. 5b the two modes of representation used (black and cross-hatched) highlight the various flow circuits through the tubes 200 and the filtrate outlets 4.

In the related art the filtration cycle of the filter 1 is divided into two phases: the filtration phase and the discharge phase. During the filtration phase the tank 3 of the filter 1 is filled with the suspension to be filtered. the tank 3 is then pressurized whereas the plates 2 are subjected to a reduced pressure via their tube 200. The liquid phase of the suspension then passes through the cloths 221 of the filter elements 22 and the solid phase remains on the surface of the cloths 221, forming a cake 6. During the filtration phase the cloths 221 are pressed onto the drains 220 of the filter element 22. The filtration phase ends when the resistance of the cakes 6 to the flow of the liquid becomes too high. It is then desired in this embodiment to detach the cakes 6 from the cloths 221, which is the discharge phase. A number of discharge methods enable the cakes 6 to be detached from the filter elements 22 but, as can be seen in FIG. 8a, this often involves directing simultaneously into all the filter elements 22 a contraflow fluid that will inflate their cloths 221 and pass through the cloths without passing through the cake 6, therefore blowing the cake 6 off the filter element 22. During blowing, the cloth 221 is inflated and moves away from the drains 220. The fluid used to detach the cakes may in particular be the filtrate, water, air or vapor.

The commonest discharge process is termed filtrate contraflow discharge. The filtrate used is most often stored during the filtration phase in a balloon termed a "blowing balloon" situated above the filter 1. During the discharge phase, after venting the tank 3 of the filter 1 to the atmosphere the filtrate is sent back by gravity alone into all the filter elements 22 of the filter 1. Once detached from their filter element 22, the cakes 6 in the suspension between the plates 2 settle to the bottom of the filter 1 before being extracted.

It is seen in FIG. 8a that in a related art filter 1, during the discharge phase, the discharged cakes 6 face one another. It is desired in this embodiment to ensure that the cakes 6 do not come into contact with one another when they are detached from the cloths 221 inflated by the filtrate.

The minimum distance E1 between the vertical axes of two adjacent filter elements 22 of the related art filter 1 typically correspond to the sum of:
the maximum inflation distance e1 between the vertical axis of a first filter element 22 and its cloth 221 inflated by the filtrate,
the detachment distance e2 of the plate 6 from the filter element 22,
the maximum allowed thickness e3 of the cake 6,
the maximum inflation distance e1 between the vertical axis of the second filter element 22 and its cloth 221 inflated by the filtrate,
the detachment distance e2 of the cake 6 from the second filter element 22,
the maximum allowed thickness e3 of the cake 6,
a safety distance e4 between facing discharged cakes 6.

$$E1=(2\times e1)+(2\times e2)+(2\times e3)+e4$$

For example there will be a minimum distance E1 of 124 mm between the vertical axes of two adjacent filler elements 22 for a maximum inflation distance e1 of 25 mm, a detachment distance e2 of 10 mm, a maximum allowed thickness e3 of 25 mm and a safety distance e4 of 4 mm.

Figure 8B:
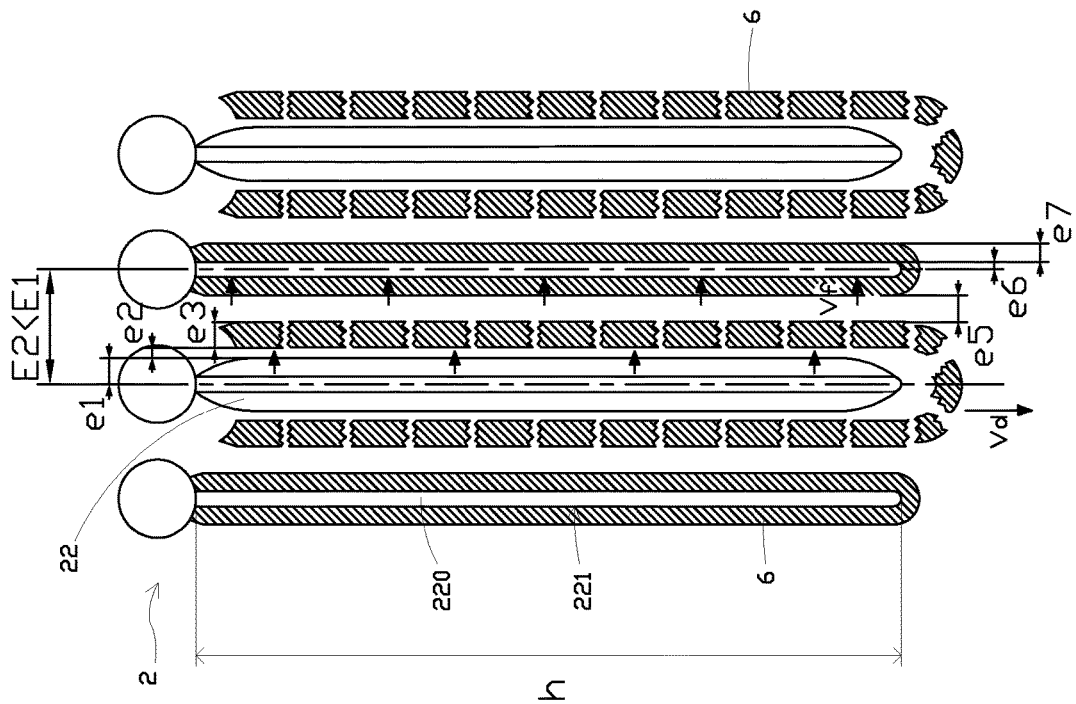
FIG. 8b is a developed diagrammatic sectional view of four plates, two non-adjacent plates of which are discharged by the method according to the invention.
Figure 8A:
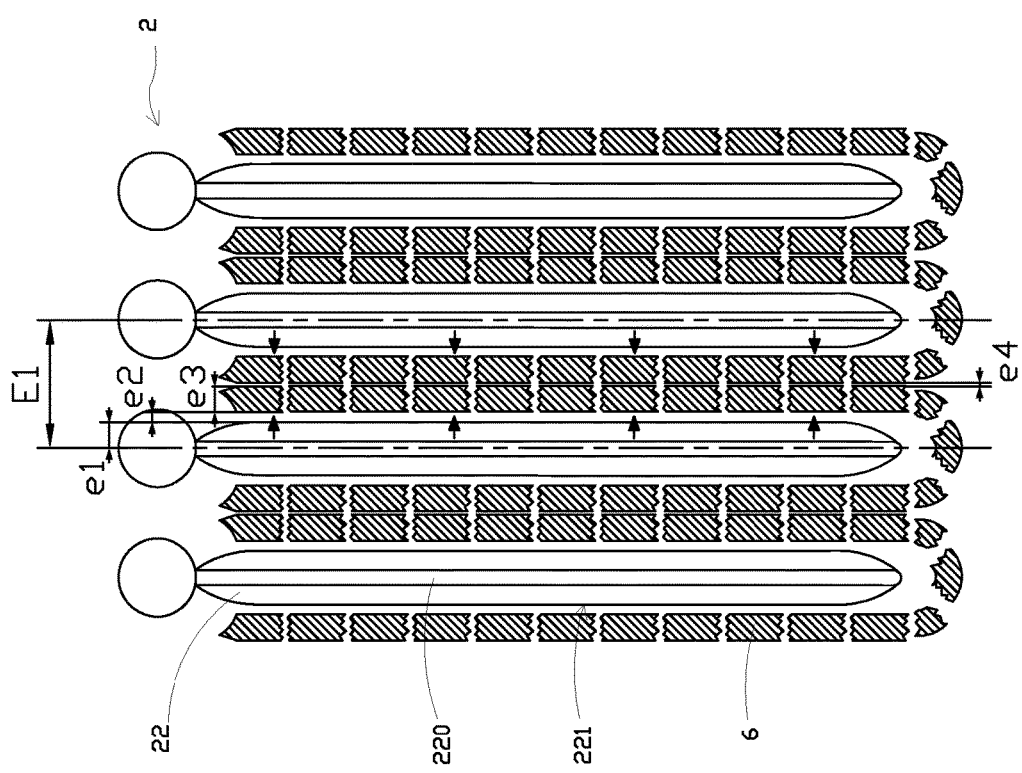

As shown diagrammatically in FIG. 8b, in which the compartments 222 from FIG. 6a are not represented, in a filter 1 of some embodiments the discharged cakes 6 are not face-to-face during the phase of discharging a group of independent plates. Each discharged cake 6 faces a cake 6 that is being formed, with a smaller thickness that can be calculated as a function of the thickness of the cake 6 discharged, not detached and under which the cloth 221 has not been inflated. To ensure that a discharged cake 6 does not come into contact with the facing cake 6 being formed, a safety distance e5 must or should be provided between them. During settling this therefore prevents the discharged cake 6 from being pressed onto the facing cake 6 being formed by the flow of suspension penetrating into the latter.

This safety distance e5 is calculated using the following formula:

$$e5=h\times Vf/Vd$$

h is the height of the filter element 22,
Vf is the velocity of the flow of suspension penetrating into the cake 6 being formed,
Vd is the velocity of the settling of the cake 6 in the suspension.

The minimum distance E2 between the vertical axes of two adjacent filter elements 22 of the filter 1 of some embodiments corresponds to the sum of:
the maximum inflation distance e1 between the vertical axis of a first filter element 22 and its cloth 221 inflated by the filtrate,
the detachment distance e2 of the cake 6 from the first filter element 22,
the maximum allowed thickness e3 of the cake 6,
the maximum distance e6 between the vertical axis of the second filter element 22 and its cloth 221 pressed onto the filter element 22,
the thickness e7 of the cake 6 being formed,
the safety distance e5.

$$E2=e1+e2+e3+e5+e6+e7$$

In the case of a filter 1 of some embodiments with two external manifolds, there will for example be a minimum distance E2 of 96 mm between the vertical axes of two adjacent filter elements 22 for a maximum inflation distance e1 of 25 mm, a detachment distance e2 of 10 mm, a maximum allowed thickness e3 of 25 mm, a height h of 3000 mm, a velocity Vf of the flow of suspension of 0.8 mm/s, a settling velocity Vd of 200 mm/s, a maximum distance e6 of 6 mm and a maximum allowed thickness e7 of 18 mm. E2 is therefore more than 20% less than E1.

The above example shows that in a filter 1 of some embodiments the minimum distance between the vertical axes of two adjacent filter elements 22 is reduced relative to the minimum distance in a related art filter 1. It is therefore possible in a filter 1 of some embodiments for the plates 2 to be closer together, the number of the plates 2 to be increased and the filter area of the filter 1 therefore to be maximized.

Figure 9:
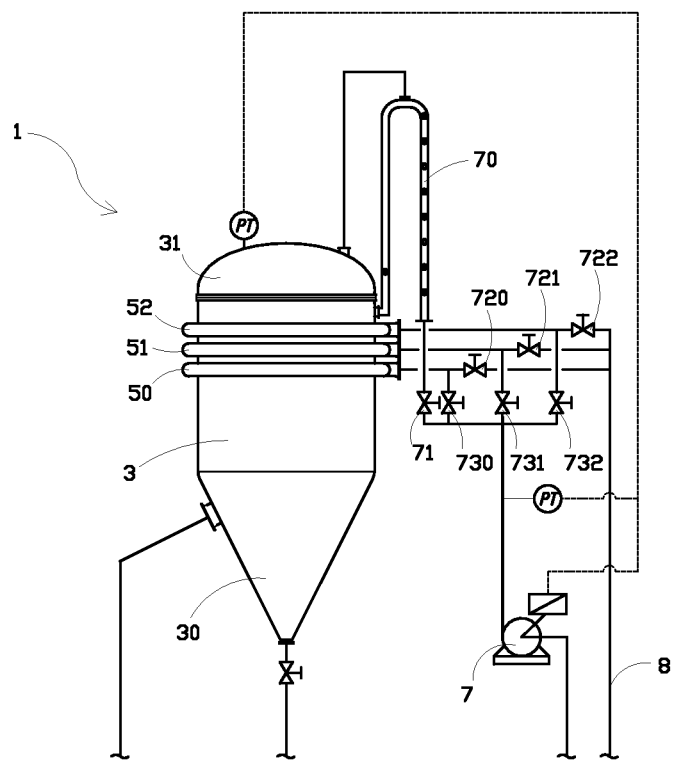
FIG. 9 is a diagram of a first variant of the method according to the invention.

The FIG. 9 diagram shows a first variant of the method of discharging a filter 1 of some embodiments with three external manifolds 5. In this configuration, during the phases of discharging the independent groups of plates 2 the difference between the pressure inside the filter elements 22 and the pressure outside the filter elements 22, measured by pressure transmitters PT, is regulated by the rotation speed of the pump 7. A swan-neck safety overflow 70 connects the outlet of the pump 7 to the high part of the tank 3 of the filter 1 via an automatic valve 71. The overflow 70 is connected at its top to the cover 31 of the filter 1 to allow free circulation of air trapped between the cover 31 of the tank 3 of the filter 1 and the overflow 70. The height of the overflow 70 will physically determine the maximum difference allowed between the pressure inside the filter elements 22 and the pressure outside the filter elements 22. During the discharge phase, at all points of the filter elements 22 of the group of independent plates 2 the difference between the pressure inside and the pressure outside the filter elements 22 will therefore be less than the pressure corresponding to the height of the overflow 70 filled with blowing fluid.

During the phase of filtration of the independent group of plates 2 that is connected to it, each of the three external manifolds 50, 51, 52 communicates with the general filtrate pipe 8 via an automatic valve 720, 721, 722. During the phase of discharging the independent group of plates 2 that is connected to it, that of the three external manifolds 50, 51, 52 concerned communicates with the outlet of the pump 7 via an automatic valve 730, 731, 732. If the discharge pressure of the pump 7 were such that the maximum allowed difference between the pressure inside the filter elements 22 and the pressure outside the filter elements 22 were to be reached, all risk of an overshoot would be avoided thanks to the excess blowing fluid overflowing into the tank 3 of the filter 1 via the overflow 70.

Figure 10:
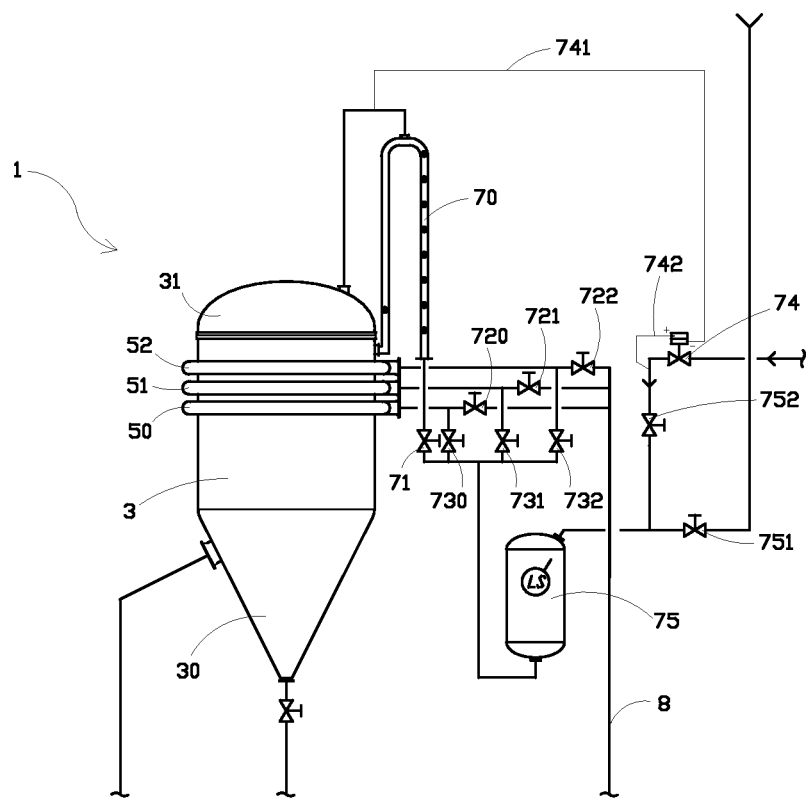
FIG. 10 is a diagram of a second variant of the method according to the invention.

The FIG. 10 diagram shows a second variant of the method for discharging a filter 1 of some embodiments with three external manifolds 5. In this configuration, during the phases of discharging independent groups of plates 2, the difference between the pressure inside the filter elements 22 and the pressure outside the filter elements 22 is regulated by a self-driven compressed air differential pressure regulator 74 installed on the compressed air feed of the over-pressurized balloon 75 filled with filtrate. The low-pressure pulse pipe 741 of the regulator 74 is connected to the cover 31 of the filter 1. The high-pressure pulse pipe 742 of the regulator 74 is connected to the compressed air supply of the over-pressurized balloon 75 downstream of the regulator 74 and upstream of the automatic isolation valve 752. A swan-neck safety overflow 70 connects the bottom of the pressurized balloon 75 to the top part of the tank 3 of the filter 1 through an automatic valve 71. The top of the overflow 70 is connected to the cover 31 of the filter 1 to allow free circulation of compressed air between the cover 31 of the tank 3 of the filter 1 and the overflow 70. The height of the overflow 70 will physically determine the maximum allowed difference between the pressure inside the filter elements 22 and the pressure outside the filter elements 22. During the discharge phase, at any point on the filter elements 22 of the group of independent plates 2 the difference between the pressure inside and the pressure outside the filter elements 22 will therefore be lower than the pressure corresponding to the height of the overflow 70 filled with blowing fluid.

During the filtration phase of the independent group of plates 2 that is connected to it, each of the three external manifolds 50, 51, 52 communicates with the general filtrate pipe 8 via an automatic valve 720, 721, 722. Before beginning the phase of discharging the independent group of plates 2 connected to it, that of the three external manifolds 50, 51, 52 concerned is connected to the over-pressurized balloons 75 via an automatic valve 730, 731, 732. The over-pressurized balloon 75 is filled with filtrate, the automatic vent valve 751 is open and automatic isolation valve 752 is closed. When the level switch LS is reached, the automatic vent valve 751 is closed and the automatic isolated valve 752 is opened to enable regulation of the difference between the pressure inside the filter elements 22 and the pressure outside the filter elements 22, thus beginning the discharge phase. If the pressure of the compressed air coming from the self-driven compressed air differential pressure regulator 74 were such that the maximum difference allowed between the pressure inside the filter elements 22 and the pressure outside the filter elements 22 were to be reached, all risk of an overshoot would be avoided thanks to the excess blowing fluid overflowing into the tank 3 of the filter 1 via the overflow 70.

Figure 11:
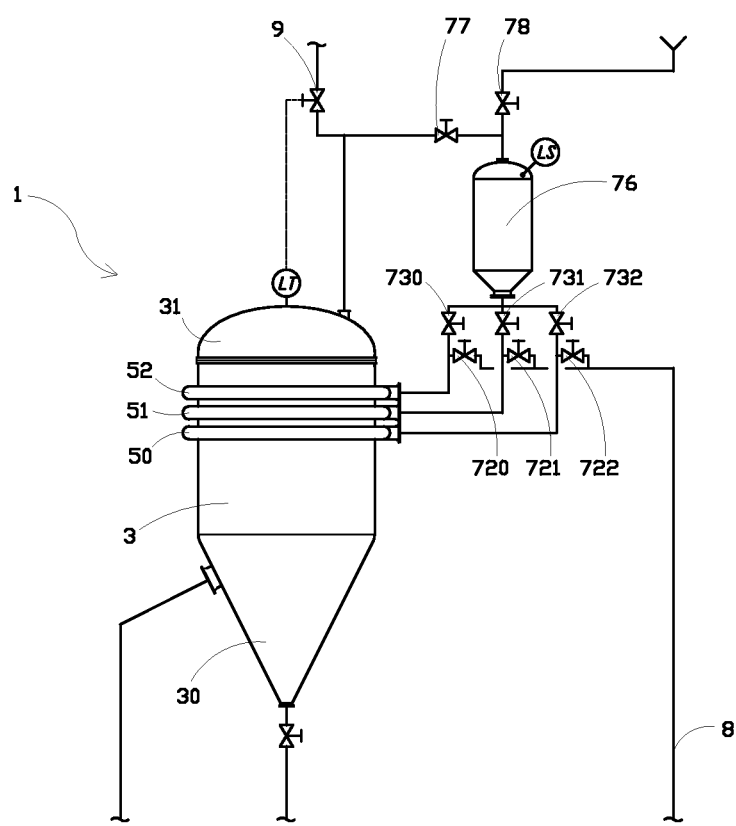
FIG. 11 is a diagram of a third variant of the method of the invention.

The FIG. 11 diagram shows a third variant of the method of discharging a filter 1 of some embodiments with three external manifolds 5. In this configuration, during phases of discharging independent groups of plates 2, the difference between the pressure inside the filter elements 22 and the pressure outside the filter elements 22 stems from the difference between the level of the filtrate in the balloon 76 and the level of the suspension in the filter 1. The top of the balloon 76 is connected to the cover 31 of the filter 1 via an automatic balancing valve 77 to allow free circulation of compressed air between the cover 31 of the tank 3 of the filter 1 and the balloon 76 during the discharge phases. The height of the balloon 76 will physically determine the maximum difference allowed between the pressure inside the filter elements 22 and the pressure outside the filter elements 22. During the discharge phase, at any point on the filter elements 22 of the group of independent plates 2 the difference between the pressure inside and the pressure outside the filter elements 22 will therefore be lower than the pressure corresponding to the height of the balloon 76 filled with blowing fluid.

During the phase of filtration of the independent group of plates 2 that is connected to it, each of the three external manifolds 50, 51, 52 communicates with the general filtrate pipe 8 via an automatic valve 720, 721, 722. Before starting a phase of discharging the independent group of plates 2 that is connected to it, that of the three external manifolds 50, 51, 52 concerned is connected to the balloon 76 via an automatic valve 730, 731, 732. The balloon 76 is filled with filtrate, the automatic vent valve 78 is open and the automatic balancing valve 77 is closed. When the level switch LS is reached, the automatic vent valve 78 is closed and the automatic balancing valve 77 is opened to balance the pressure at the top of the filter 1 and the pressure at the top of the balloon 76, thus beginning the discharge phase. During this phase, the balloon directs the filtrate by gravity alone into the external manifold 50, 51, 52 concerned. The level of suspension in the filter 1, measured on the level transmitter LT, increases. A setpoint suspension level in the filter 1 is re-established after each discharge phase by injecting compressed air at the top of the filter 1 via the automatic valve 9. The height of the balloon 76 is such that the maximum difference allowed between the pressure inside the filter elements 22 and the pressure outside the filter elements 22 is never or rarely exceeded.

Figure 12:
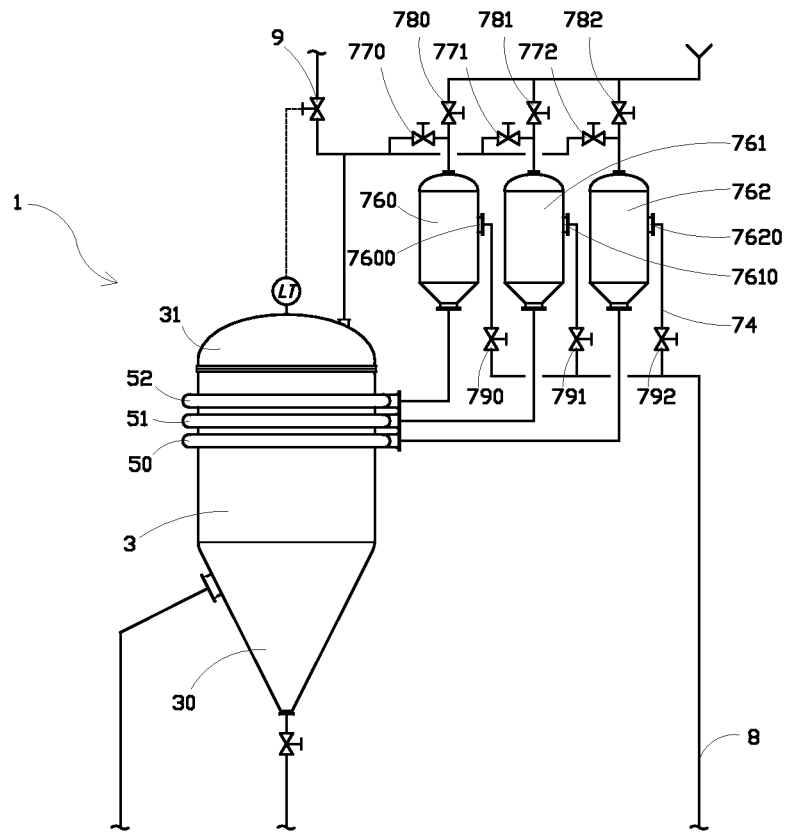
FIG. 12 is a diagram of a fourth variant of the method of the invention.

The FIG. 12 diagram shows a fourth variant of the method of discharging a filter 1 of some embodiments with three external manifolds 5. In this configuration, during phases of discharging independent groups of plates 2, the difference between the pressure inside the filter elements 22 and the pressure outside the filter elements 22 stems from the difference between the level of the filtrate in one of the balloons 760, 761, 762 and the level of the suspension in the filter 1. During the discharge phase, the tops of the balloons 760, 761, 762 are connected to the cover 31 of the filter 1 via an automatic balancing valve 770, 771, 772 to allow free circulation of compressed air between the cover 31 of the tank 3 of the filter 1 and one of the balloons 760, 761, 762. The height of the balloons 760, 761, 762 will physically determine the maximum difference allowed between the pressure inside the filter elements 22 and the pressure outside the filter elements 22. During the discharge phase, at any point of the filter elements 22 of the group of independent plates 2 the difference between the pressure inside and the pressure outside the filter elements 22 will therefore be lower than the pressure corresponding to the height of the balloons 760, 761, 762 filled with blowing fluid.

During the phase of filtration of the independent group of plates 2 that is connected to it, each of the three external manifolds 50, 51, 52 communicates with the general filtrate pipe 8 via its own balloon 760, 761, 762, the overflow 7600, 7610, 7620 of the balloon 761, 762, 763 and the filtrate outlet valve 790, 791, 792 of the balloon 761, 762, 763. Before beginning the phase of discharging the independent group of plates 2 that is connected to it, that of the three external manifolds 50, 51, 52 concerned is in direct communication with its balloon 760, 761, 762. The automatic vent valve 780, 781, 782 and the automatic filtrate outlet valve of the balloon 760, 761, 762 are closed and the automatic balancing valve 770, 771, 772 of the balloon 760, 761, 762 is opened to balance the pressure at the top of the filter 1 and the pressure at the top of the balloon 760, 761, 762 thereby beginning the discharge phase. During that phase the balloon 760, 761, 762 directs the filtrate by gravity alone into the external manifold 50, 51, 52 concerned. The level of the suspension in the filter 1, measured on the level transmitter LT, increases. A setpoint suspension level in the filter 1 is re-established after each discharge phase by injecting compressing air at the top of the filter 1 via the automatic valve 9. The height of the balloons 760, 761, 762 is such that the maximum difference allowed between the pressure inside the filter elements 22 and the pressure outside the filter elements 22 is never or rarely exceeded.

The invention claimed is:

1. A filter for use with a drain, the filter comprising:
   a tank;
   at least two external manifolds; and
   multiple vertical plates suspended vertically inside the tank that each includes a tube connected to one of the at least two external manifolds outside the tank and configured to discharge a filtrate, wherein two adjacent vertical plates of the multiple vertical plates are connected to different manifolds of the at least two manifolds so that plates of the multiple vertical plates connected to the same one of the at least two external manifolds form an independent group of non-adjacent plates that can be discharged simultaneously such that a cake being formed faces a cake being discharged, the independent group of non-adjacent plates configured to discharge by blowing contraflow alternatively in each of the at least two external manifolds, each of the multiple vertical plates also including at least one filter element, each of the at least one filter element including:
   at least two drains; and
   a cloth defining compartments configured such that one of the at least two drains is insertable in each one of the compartments, wherein
   the compartments are further configured to inflate during discharge, and
   the cloth is configured to press onto one of the at least two drains of each one of the at least two compartments during a filtration phase.

2. The filter according to claim 1, wherein the plates are disposed as a star.

3. The filter according to claim 2, further including an alternation of double plates with two filter elements including a long tube and single plates with one filter element including a short tube.

4. The filter according to claim 3, wherein the single plates are connected to a double plate, thus forming pairs of plates.

5. The filter according to claim 4, wherein the short tube of a single plate is connected to the long tube of a double plate by a pipe connecting the two plates.

6. The filter according to claim 4, wherein the pairs of plates are connected to one and only one external manifold through a tube of the double plate.

7. The filter according to claim 3, further including N external manifolds, wherein:
   N is greater than or equal to three.

8. The filter according to claim 4, further including N external manifolds, wherein N is greater than or equal to three, wherein
   for the pairs of plates, N consecutive pairs of plates are connected to the N external manifolds and wherein the single plate and the double plate of a same pair of the pairs of plates are spaced by an even number of plates.

* * * * *